(12) United States Patent
Hayashi et al.

(10) Patent No.: US 7,626,167 B2
(45) Date of Patent: Dec. 1, 2009

(54) INFRARED SENSOR

(75) Inventors: Koji Hayashi, Kyoto (JP); Takeshi Takeda, Hakusan (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 11/937,218

(22) Filed: Nov. 8, 2007

(65) Prior Publication Data
US 2008/0087824 A1    Apr. 17, 2008

Related U.S. Application Data (63) Continuation of application No. PCT/JP2006/308342, filed on Apr. 20, 2006.

(30) Foreign Application Priority Data
May 11, 2005   (JP) .............................. 2005-138991

(51) Int. Cl.
*G01J 5/02*   (2006.01)
(52) U.S. Cl. .............................. 250/339.01; 250/338.1; 438/55; 438/64
(58) Field of Classification Search .............. 250/338.1, 250/338.3, 353; 438/55, 64
See application file for complete search history.

(56) References Cited

U.S. PATENT DOCUMENTS 5,468,960 A * 11/1995 Sugimoto et al. ........ 250/338.3
6,046,070 A *  4/2000 Shoji et al. .................... 438/66
2008/0251722 A1 * 10/2008 Hayashi et al. .......... 250/338.1

FOREIGN PATENT DOCUMENTS

| JP | 01032131 A | * | 2/1989 |
| JP | 04-127530 U | | 11/1992 |
| JP | 04-138246 U | | 12/1992 |
| JP | 07-190852 A | | 7/1995 |
| JP | 08-015007 A | | 1/1996 |
| JP | 09-079902 A | | 3/1997 |

OTHER PUBLICATIONS

Official communication issued in the International Application No. PCT/JP2006/308342, mailed on Aug. 1, 2006.
Official communications issued in counterpart Chinese Application No. 200680016085.6, issued on Apr. 3, 2009.

* cited by examiner

*Primary Examiner*—David P Porta
*Assistant Examiner*—Casey Bryant
(74) *Attorney, Agent, or Firm*—Keating & Bennett, LLP (57) ABSTRACT

A small infrared sensor has a wide infrared light-receiving area (viewing angle), high electromagnetic shielding characteristics, and excellent electromagnetic-wave resistance characteristics. In the infrared sensor, supporting portions are disposed at four corners of a substantially rectangular opening in a package. The supporting portions support an optical filter, disposed so as to cover the opening, at positions that are lower than an upper end of an inner peripheral wall defining the opening. While the optical filter is supported by the supporting portions as a result of inserting a portion of a surface side of the optical filter facing the supporting portions into the opening, the optical filter is secured to the package. The optical filter and the package are joined and secured, and electrically connected to each other through a conductive adhesive.

3 Claims, 8 Drawing Sheets

INFRARED SENSOR

BACKGROUND OF THE INVENTION

1. Field of the Invention

The present invention of the application relates to an infrared sensor. More particularly, the present invention relates to an infrared sensor having a wide viewing angle and detecting infrared radiation, and to an infrared sensor having improved electromagnetic shielding characteristics.

2. Description of the Related Art

Figure 6:
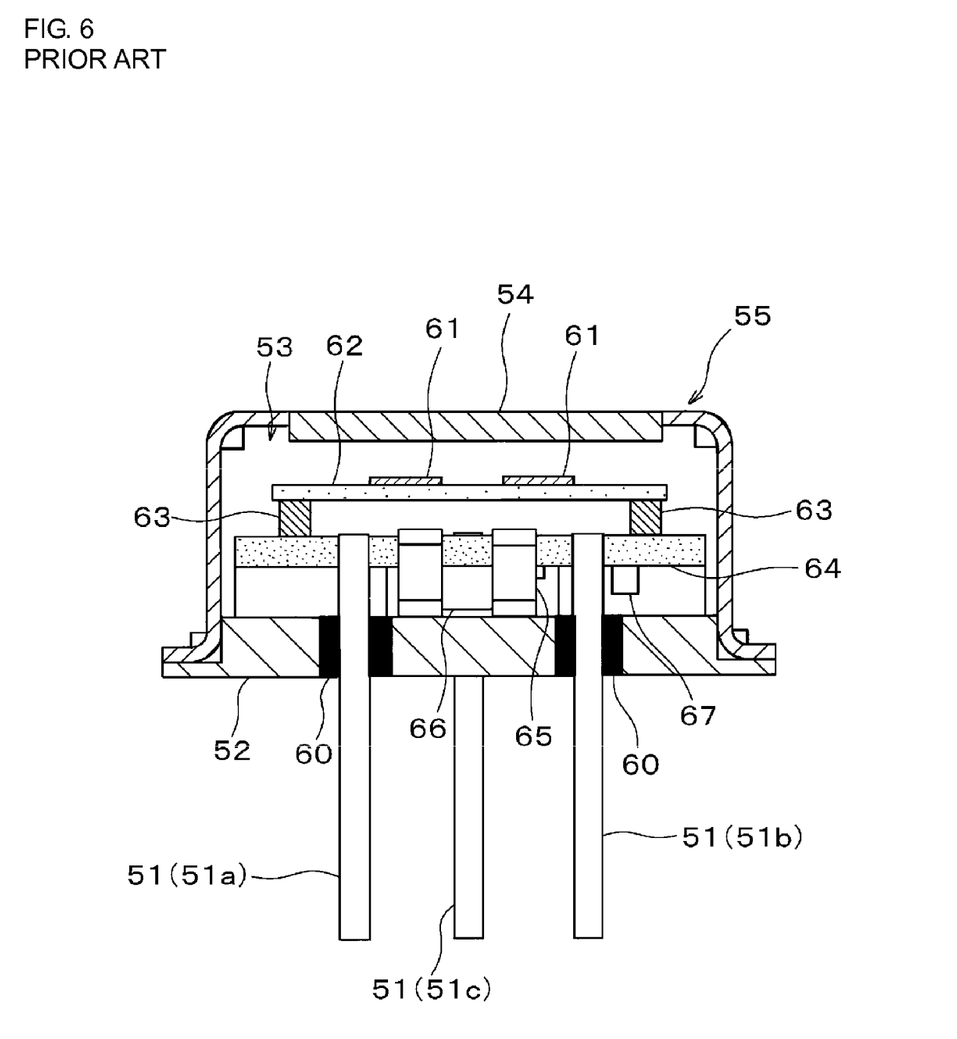
FIG. 6 shows a structure of a related infrared sensor.

As one type of related infrared sensor used in, for example, human body detection and crime-preventing devices, the following infrared sensor with lead terminals is provided. As shown in FIG. 6, in the infrared sensor, an infrared sensor element 53 having light-receiving electrodes 61 disposed on a pyroelectric element 62 is supported on a metallic base (stem) 52 having lead terminals 51. In addition, the infrared sensor element 53 is accommodated in a cylindrical metallic case (cap) 55 including an optical filter 54 provided at the upper surface side of the case 55 and transmitting infrared radiation. Further, the infrared sensor ordinarily includes a supporting table 63, a substrate 64, a bypass capacitor 65, an FET 66, and a resistor 67. The supporting table 63 supports the infrared sensor element 53. The substrate 64 has the supporting table 63 placed thereon, and has necessary electrodes and circuits (not shown) provided on its surface. The input/output lead terminals 51 (51a and 51b) of the infrared sensor pass through the metallic stem 52 through an insulating material 60, and are connected to the circuits on the substrate 64. The ground lead terminal 51 (51c) is electrically connected to the stem 52.

Figure 7:
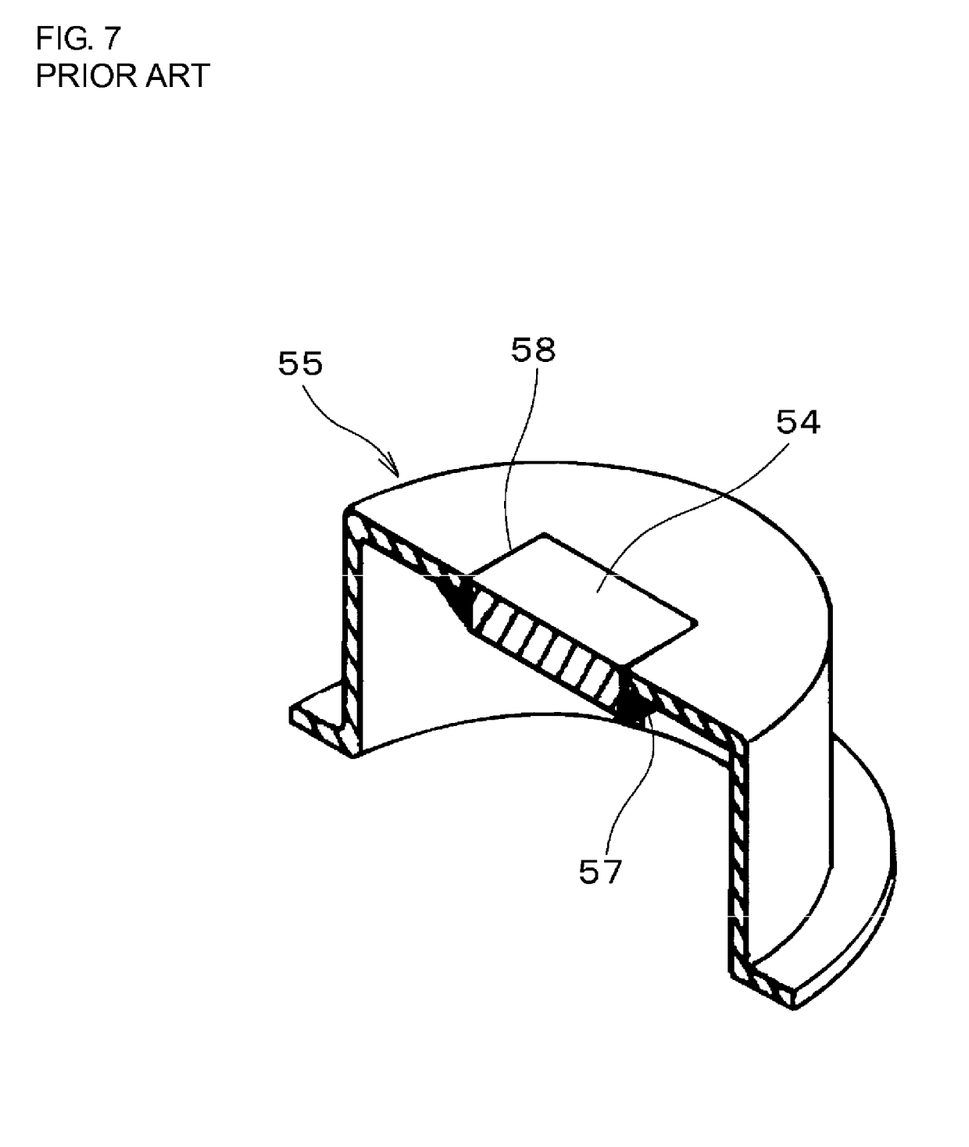
FIG. 7 shows a mounting structure of mounting an optical filter to a package in the related infrared sensor.

As a mounting structure (mounting method) for mounting the optical filter to the metallic case (cap) in such type of infrared sensor, the following mounting structure (mounting method) is proposed. For example, as shown in FIG. 7, the mounting structure (mounting method) is such that the optical filter 54 is disposed at an opening window 58 of the metallic case 55 so that the outer surface of the optical filter 54 and the outer surface of the metallic case 55 are flush with each other. In addition, edges of the optical filter 54 and edges defining the opening window 58 are adhered and secured to each other with a conductive adhesive 57. See, for example, Japanese Unexamined Patent Application Publication No. 9-79902.

However, in the infrared sensor in the aforementioned Japanese Unexamined Patent Application Publication No. 9-79902, the optical filter 54 is fitted to a portion (opening window) 58 of the top surface of the metallic case 55. Therefore, the entire top surface of the metallic case 55 does not become a light-receiving surface. As a result, an infrared light-receiving area (viewing angle) becomes narrow.

Figure 8:
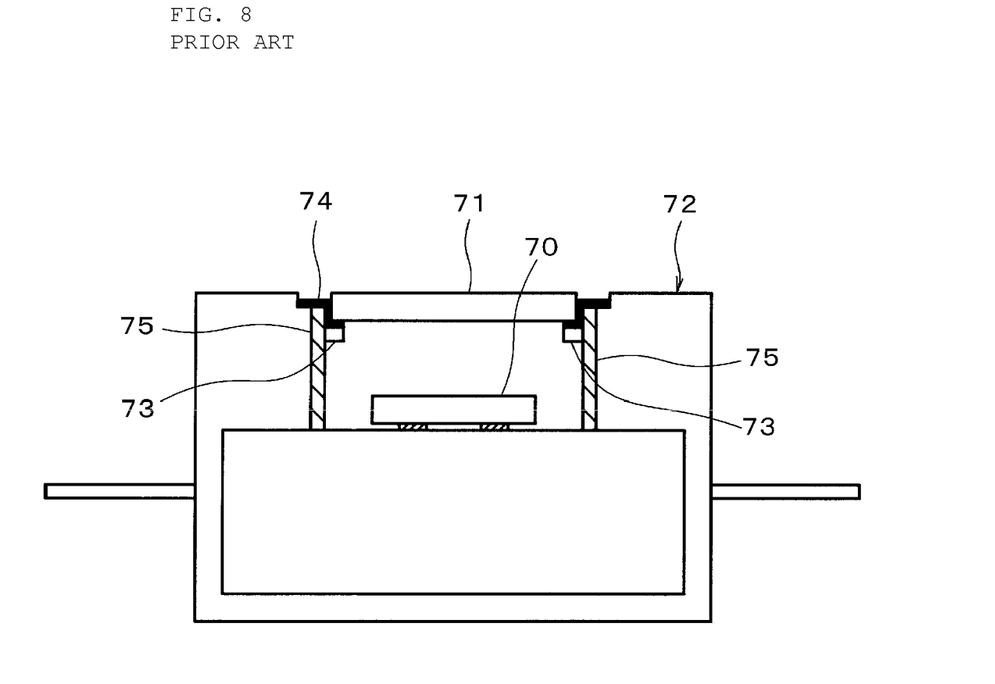
FIG. 8 shows a mounting structure of mounting an optical filter to a package in another related infrared sensor.

As another type of infrared sensor, the following infrared sensor is proposed. As shown in FIG. 8, in the infrared sensor, an optical filter 71 is held by shelves 73, formed at a conductive inner-peripheral heat-transmitting covering member 75, disposed at an inner peripheral portion of a conductive protecting member (package) 72. In addition, using a conductive adhesive 74, end surfaces of the optical filter 71 are joined to an inner peripheral surface of the conductive inner-peripheral heat-transmitting covering member 75, and the bottom surface of the optical filter 71 is joined to the bottom surfaces of the shelves 73, formed at the conductive inner-peripheral heat-transmitting covering member 75. As a result, the optical filter 71 is electrically connected to the conductive protecting member (package) 72, so that electromagnetic shielding characteristics are enhanced. See, for example, Japanese Unexamined Patent Application Publication No. 8-15007.

Figure 9:
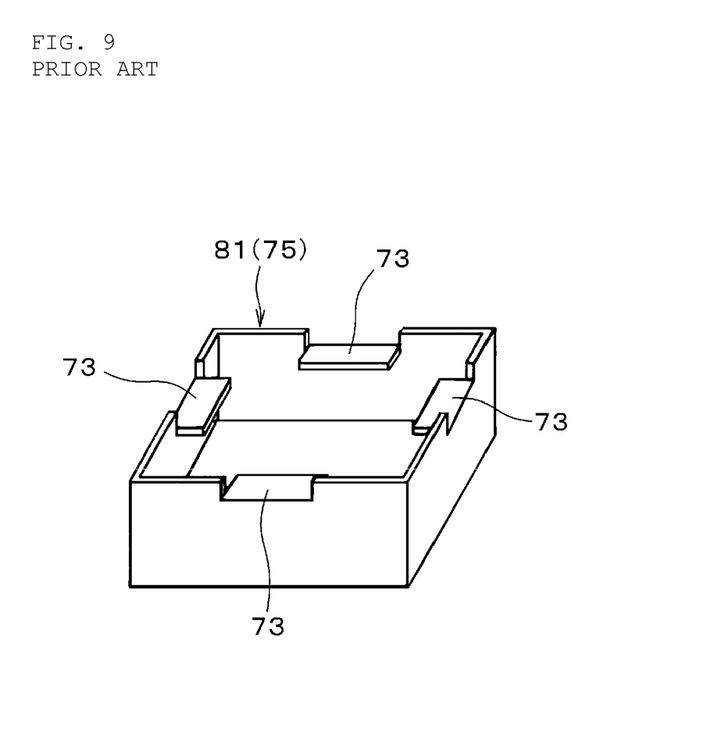
FIG. 9 shows a structure of the main portion of the related infrared sensor shown in FIG. 8.

However, the structure of the infrared sensor discussed in Japanese Unexamined Patent Application Publication No. 8-15007 is provided to increase electromagnetic shielding characteristics and to reduce the influence of an ambient temperature change on an infrared sensor element. As illustrated in FIG. 9 (illustrating an embodiment disclosed in Japanese Unexamined Patent Application Publication No. 8-15007), when the infrared sensor has a structure in which portions of a metallic plate 81, which becomes the conductive inner-peripheral heat-transmitting covering member 75, are bent to form the shelves 73 at substantially central portions of the respective sides, the shelves 73 restrict the viewing angle of the optical filter 71 (see FIG. 8). Therefore, the infrared sensor cannot provide a viewing angle with maximum efficiency.

SUMMARY OF THE INVENTION

In order to solve the problems described above, preferred embodiments of the present invention provide a small infrared sensor that can provide a wide infrared light-receiving area (viewing angle), and an infrared sensor having high electromagnetic shielding characteristics and excellent electromagnetic-wave resistance characteristics.

An infrared sensor according to a preferred embodiment of the present invention includes an infrared sensor element, a box package, and an optical filter. The box package accommodates the infrared sensor element in an interior thereof so as to allow surface mounting, and has one substantially rectangular side that is open. The optical filter is formed so as to transmit infrared radiation of a predetermined wavelength. In addition, the optical filter is disposed so as to cover the opening, whose shape is substantially rectangular in plan view, of the package. Further, the optical filter functions to cause the infrared sensor element to receive the infrared radiation having the predetermined wavelength, and functions as a cover that seals the opening, at the same time. Supporting portions are disposed at four corners of the opening, whose shape is substantially rectangular in plan view, of the package. In addition, the supporting portions support the optical filter, which is disposed so as to cover the opening, at positions that are lower than an upper end of an inner peripheral wall defining the opening. While the optical filter is supported by the supporting portions as a result of inserting a portion of a surface side of the optical filter facing the supporting portions into the opening, the optical filter is secured to the package.

The optical filter and the package preferably are joined and secured, and electrically connected to each other through a conductive adhesive.

The package preferably includes a metallic package body and an insulating covering material that covers a main portion of the metallic package body. The metallic package body is exposed at an area that is connected to the optical filter through the conductive adhesive, so that the conductive adhesive electrically connects the optical filter and the package body to each other.

A peripheral area defining the opening of the package is preferably lower than an outer-side area of the peripheral area defining the opening. The peripheral area cooperates with a side end of a portion protruding from the upper end of the inner peripheral wall defining the opening of the optical filter, so as to form a holding recess that holds the conductive adhesive.

The infrared sensor preferably includes an infrared sensor element, a box package, which accommodates the infrared sensor element in the interior thereof, and an optical filter, which is disposed so as to cover the opening of the package and functioning simultaneously as a filter and a cover that seals the opening. In the infrared sensor, supporting portions are disposed at four corners of the opening, whose shape is substantially rectangular in plan view, of the package. In addition, the supporting portions support the optical filter, which is disposed so as to cover the opening, at positions that are lower than the upper end of the inner peripheral wall defining the opening. While the optical filter is supported by the supporting portions as a result of inserting a portion of a surface side of the optical filter facing the supporting portions into the opening, the optical filter is secured to the package. Therefore, a proportion of a portion (area) that blocks a viewing angle to an entire surface area of the optical filter can be considerably reduced. Therefore, practically speaking, it is possible to mount the optical filter to the package without narrowing an infrared light-receiving area (viewing angle).

Since supporting portions are provided at the four corners of the opening whose shape is substantially rectangular in plan view, the optical filter is reliably held, so that it is possible to provide a highly reliable infrared sensor.

When the optical filter and the package are joined and secured to each other through a conductive adhesive, electrical connection and mechanically joining and securing of the optical filter and the package to each other can be simultaneously and more reliably performed. Therefore, preferred embodiments of the present invention can be made more effective.

The package preferably includes a metallic package body and an insulating covering material that covers a main portion of the metallic package body. The metallic package body is exposed at an area that is connected to the optical filter through the conductive adhesive, so that the conductive adhesive electrically connects the optical filter and the package body to each other. In this case, it is possible to reliably provide a highly reliable ceramic electronic component having the optical filter and the package electrically connected to each other while being insulated from the outside, so as to provide excellent electromagnetic shielding characteristics and insulation characteristics with respect to the outside. Therefore, preferred embodiments of the present invention can be made even more effective.

A peripheral area defining the opening of the package is formed lower than an outer-side area of the peripheral area defining the opening. The peripheral area cooperates with a side end of a portion protruding from the upper end of the inner peripheral wall defining the opening of the optical filter, so as to form a holding recess that holds the conductive adhesive. In this case, it is possible to reliably electrically and mechanically connect the optical filter and the package to each other with a conductive adhesive held in the holding recess.

Since the conductive adhesive is held in the holding recess by an amount corresponding to the volume of the holding recess, excess conductive adhesive flows up to the central area of the optical filter, so that it is possible to reliably prevent the viewing angle from being narrowed. Therefore, it is possible to provide an infrared sensor providing predetermined characteristics.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Features of the present invention will be described below in more detail with reference to preferred embodiments of the invention.

Figure 1:
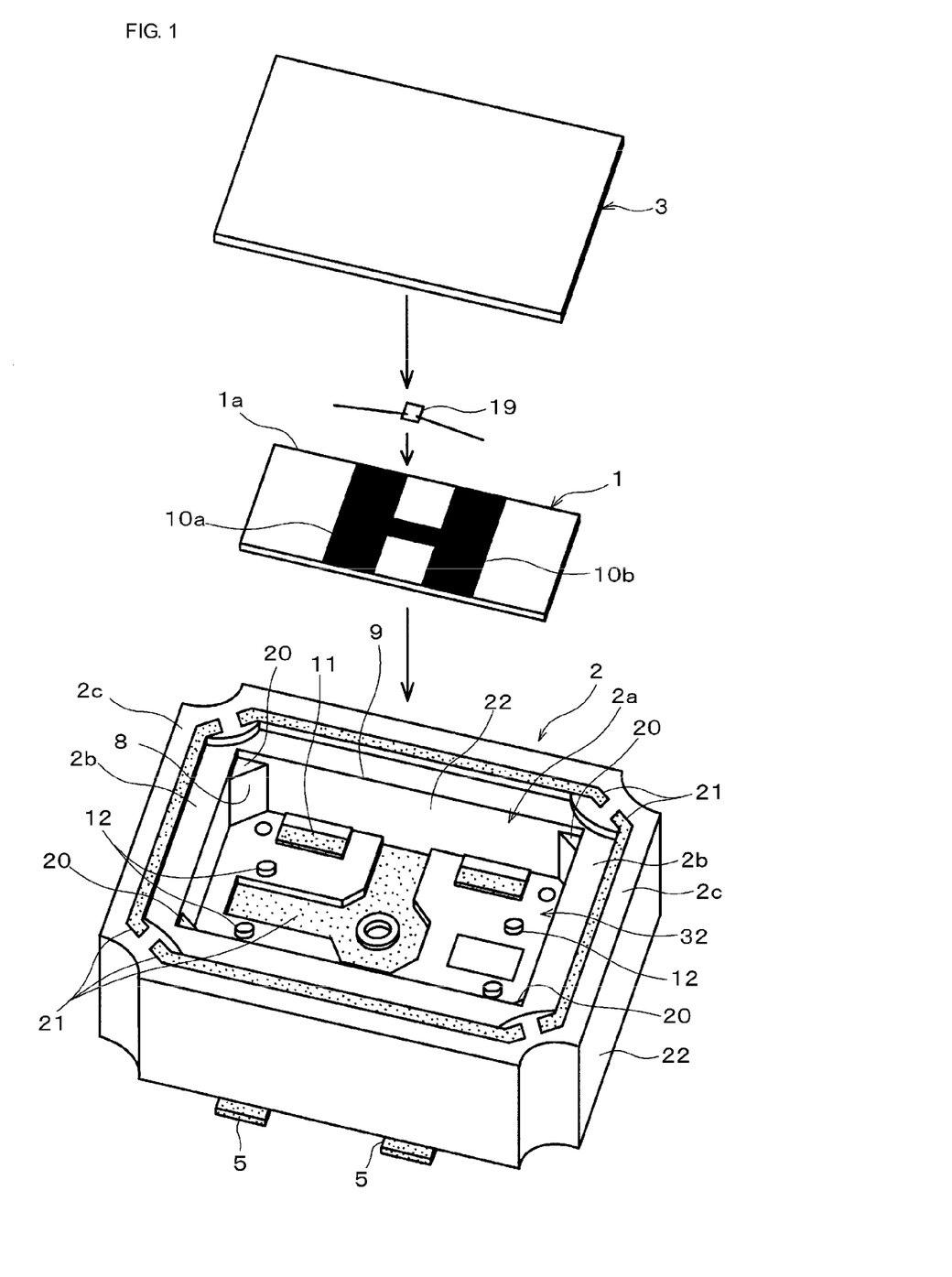
FIG. 1 is an exploded perspective view of an infrared sensor according to a preferred embodiment of the present invention.
Figure 2:
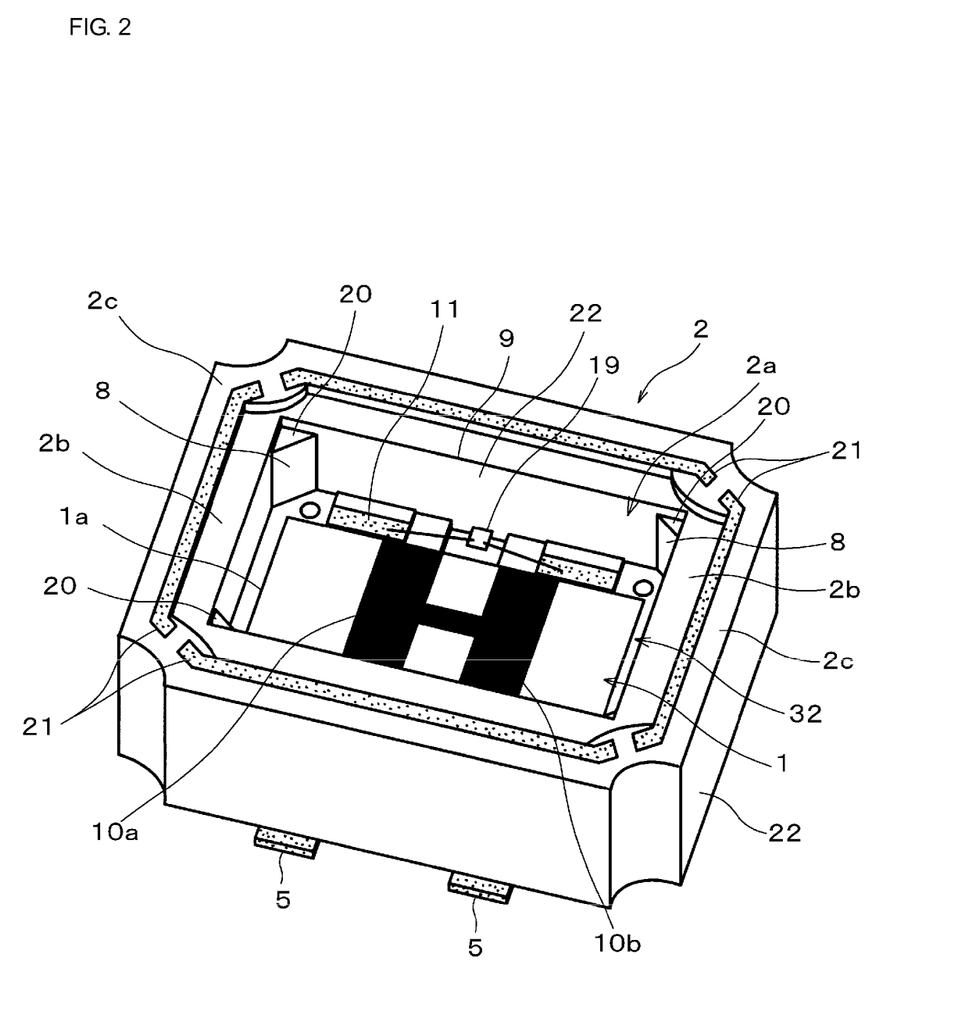
FIG. 2 shows a state in which an infrared sensor element is accommodated in a package in the infrared sensor according to a preferred embodiment of the present invention.
Figure 3:
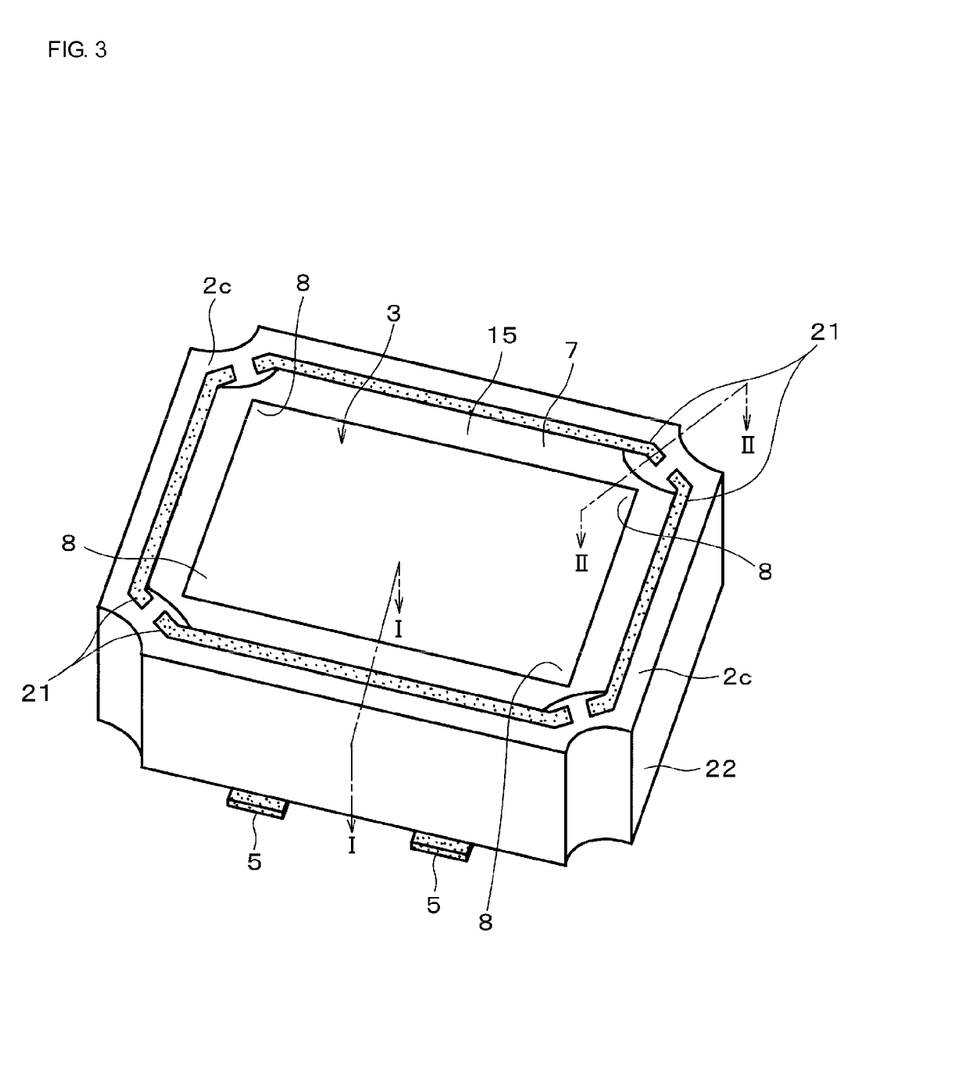
FIG. 3 is a perspective view showing a state in which an optical filter is mounted to an opening of the package in the infrared sensor according to a preferred embodiment of the present invention.
Figure 4:
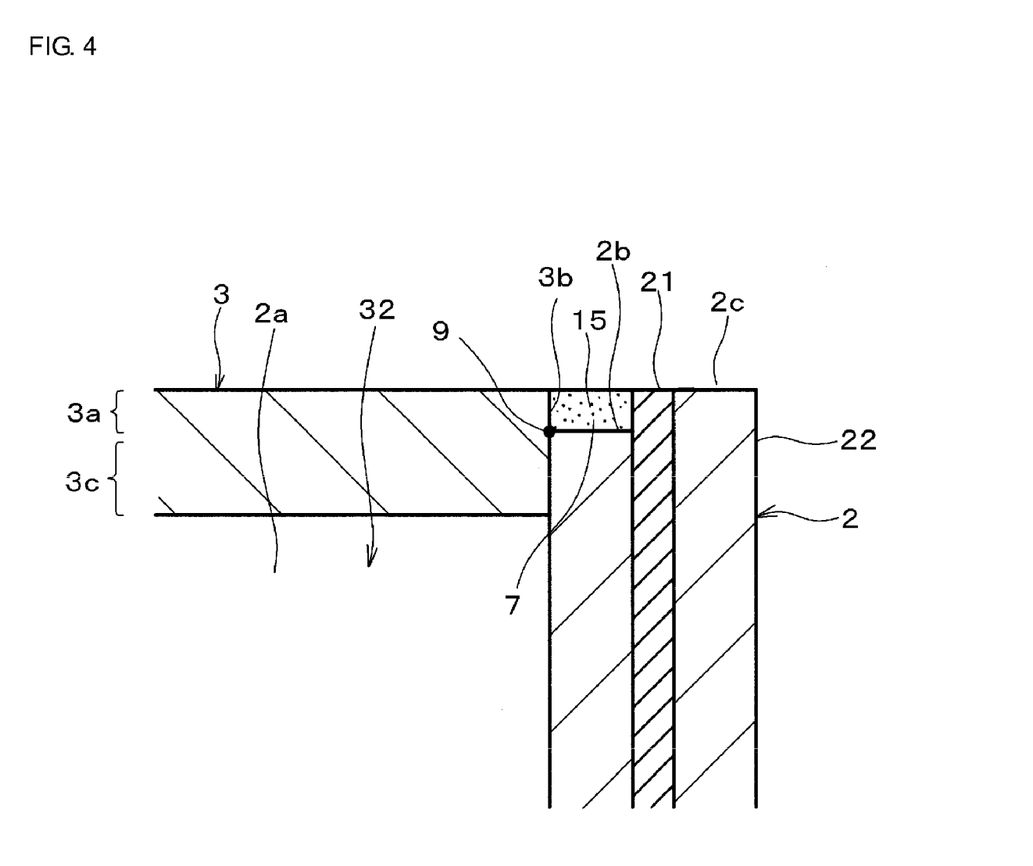
FIG. 4 is an enlarged view of a main portion of cross section taken along line I-I of the infrared sensor shown in FIG. 3.
Figure 5:
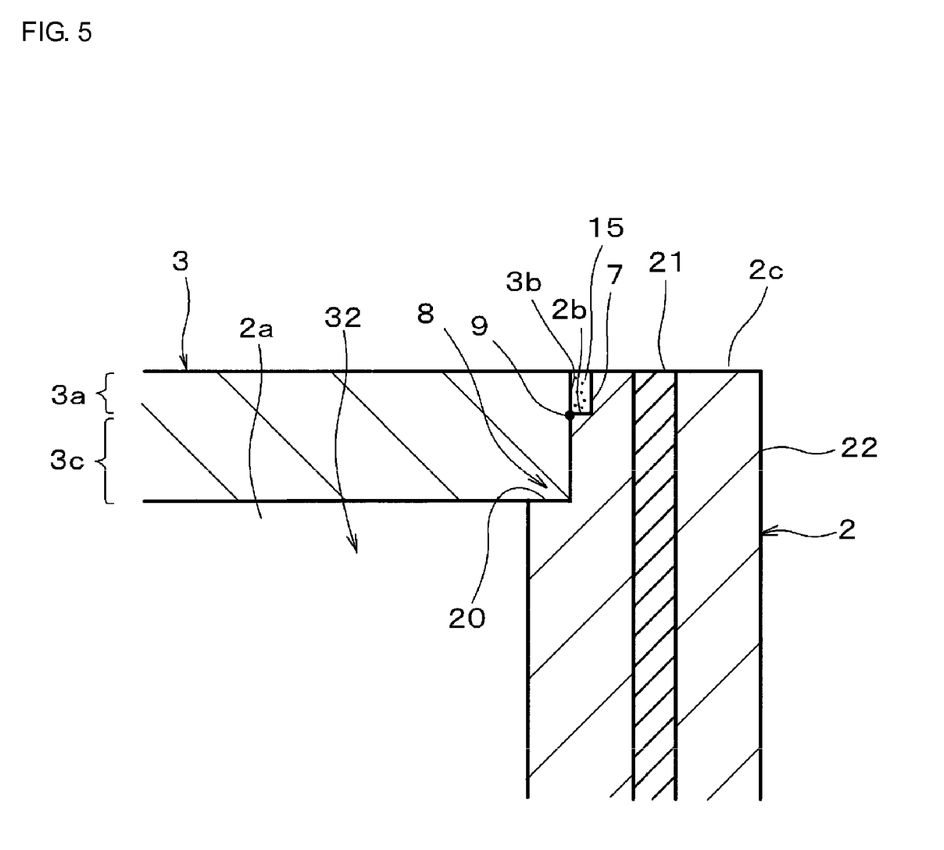
FIG. 5 is an enlarged view of a main portion of a cross section taken along line II-II shown in FIG. 3.

FIG. 1 is an exploded perspective view of an infrared sensor according to a preferred embodiment of the present invention. FIG. 2 shows a state in which an infrared sensor element is accommodated. FIG. 3 is a perspective view showing a state in which an optical filter is mounted to an opening of a package. FIG. 4 is an enlarged view of a main portion of cross section taken along line I-I of the infrared sensor shown in FIG. 3. FIG. 5 is an enlarged view of a main portion of a cross section taken along line II-II shown in FIG. 3.

The infrared sensor includes an infrared sensor element 1, a metallic package 2, and an optical filter 3. The package 2 has a box shape and has one side (top side in FIG. 1) open. In addition, the package 2 has electrodes 11 (and wiring patterns, etc.) provided in its interior portion. Further, the package 2 accommodates the infrared sensor element 1 in an inner portion (sealing space) 32 so as to allow surface mounting. The optical filter 3 is disposed so as to completely cover an opening 2a of the package 2. In addition, the optical filter 3 functions to cause the infrared sensor element 1 to receive infrared radiation of a predetermined wavelength and functions as a cover that seals the opening 2a of the package 2, at the same time.

As the infrared sensor element 1, a dual-type infrared sensor element is preferably used. In the dual-type sensor element, two electrodes (light-receiving electrodes) 10a and 10b, disposed on a surface of a pyroelectric element 1a polarized in a thickness direction, are connected in series and with reversed polarity, so that external noise (such as ambient temperature change) input to the two light-receiving electrodes 10a and 10b at the same time is canceled out.

As the package 2, a box package having a substantially completely open top and formed by covering a main portion of a metallic package body 21 by an insulating covering material 22 is used. The package body 2 is formed of a metal, such as 42Ni, phosphor bronze, brass, white metal, or iron. The shape of the opening 2a of the package 2 in plan view preferably is substantially rectangular.

At an area of the package 2 that is connected to the optical filter 3 through a conductive adhesive 7 (see FIGS. 3, 4, and 5), the metallic package body 21 is exposed, so that the optical filter 3 and the package body 21 are electrically connected to each other by the conductive adhesive 7.

A peripheral area 2b defining the opening of the package 2 is preferably lower than an outer-side area 2c of the peripheral area 2b of the opening. The peripheral area 2b cooperates with a side end 3b of a portion 3a protruding from an upper end 9 of the inner peripheral wall defining the opening 2a of the optical filter 3, so as to form a holding recess 15 that holds the conductive adhesive 7 (see FIG. 4).

Bases 12, which support the infrared sensor element 1, are disposed at the bottom surface of the package 2, and the infrared sensor element 1 is supported on the bases 12.

A field effect transistor 19, for defining the infrared sensor, is disposed in the package 2. In addition, a bypass capacitor, a resistor having a high resistance value, etc., are mounted in the package 2 or are integrally provided with the package 2. In FIGS. 1 and 2, the components other than the field effect transistor 19 are not shown.

In the infrared sensor according to the first preferred embodiment, external connection terminals (external electrodes) 5 that are insulated by an insulating material (not shown) so as not to be electrically conductive with the package 2 are provided at predetermined locations of the metallic package 2. The infrared sensor element 1, disposed in the package 2, is formed so as to be electrically connected to the outside through the electrodes and wiring patterns, similarly disposed in the package 2, and the external connection terminals (external electrodes) 5.

Supporting portions 20 are disposed at four corners 8 of the opening 2a, whose shape is substantially rectangular in plan view, of the package 2. The supporting portions 20 support the optical filter 3, which is disposed so as to cover the opening 2a, at positions that are lower than the upper end 9 of the inner peripheral wall defining the opening 2a.

The supporting portions 20 are formed of the same material as the insulting covering material 22 that covers the main portion of the metallic package body 21. However, the supporting portions 20 may be formed of a material that is different from the insulating covering material 22.

As the optical filter 3, an optical filter formed of single-crystal silicon having a resistance less than or equal to 1 MΩ/cm and transmitting infrared radiation of a predetermined wavelength is preferably used. The optical filter 3 preferably has a substantially rectangular shape in plan view substantially in correspondence with the opening 2a in the top surface of the package 2.

As shown in FIG. 4, which is an enlarged view of the main portion of the cross section along the line I-I of the infrared sensor shown in FIG. 3, and as shown in FIG. 5, which is an enlarged view of the main portion of the cross section along the line II-II shown in FIG. 3, in the infrared sensor having the above-described structure, the supporting portions 20, disposed at the four corners 8 of the opening 2a of the package 2, support the optical filter 3 at the positions that are lower than the upper end 9 of the inner peripheral wall defining the opening 2a. In addition, the conductive adhesive 7, supplied to and held by the holding recess 15, firmly connects (the side end 3b of) the optical filter 3 and (the opening peripheral area 2b and the exposed metallic package body 21 of) the package 2. Therefore, it is possible to provide an infrared sensor in which the optical filter 3 and the package 2 are reliably electrically and mechanically connected and secured to each other.

That is, in the infrared sensor according to a preferred embodiment of the present invention, the supporting portions 20, which support the optical filter 3, disposed so as to cover the opening 2a, at the positions that are lower than the upper end 9 of the inner peripheral wall defining the opening 2a, are provided at the four corners 8 of the opening 2a of the package 2a. In addition, while the optical filter 3 is supported by the supporting portions 20 as a result of inserting a portion (lower portion) 3c of a surface side of the optical filter 3 facing the supporting portions 20 into the opening 2a, the optical filter 3 is secured to the package 2 with the conductive adhesive 7. Therefore, a proportion of a portion where the viewing angle is blocked by the supporting portions, to an entire surface area of the optical filter 3 can be made very low. Consequently, practically speaking, it is possible to mount the optical filter 3 to the package 2 without narrowing an infrared light-receiving area (viewing angle).

Since the supporting portions 20 are provided at the four corners 8 of the opening 2a having a substantially rectangular shape in plan view, the optical filter 3 is reliably held, so that a highly reliable infrared sensor can be provided.

As the package 2, a box package having a structure in which the main portion of the metallic package body 21 is covered by the insulating covering material 22 is used. Therefore, while ensuring insulating characteristics with respect to the outside, the optical filter 3 and the package 2 are reliably electrically connected to each other. Consequently, it is possible to reliably provide a highly reliable ceramic electronic component having excellent electromagnet shielding characteristics and insulating characteristics with respect to the outside.

In addition, the peripheral area 2b defining the opening of the package 2 is formed lower than the outer-side area 2c of the peripheral area 2b defining the opening. In addition, the peripheral area 2b cooperates with the side end 3b of the portion 3a of the optical filter 3 protruding from the upper end 9 of the inner peripheral wall defining the opening 2a, so that the holding recess 15 holding the conductive adhesive 7 is formed. Therefore, the conductive adhesive 7 held by the holding recess 15 makes it possible to reliably electrically and mechanically connect the optical filter 3 and the package 2 to each other.

Further, since the conductive adhesive 7 is held in the holding recess 15 by an amount corresponding to the volume of the holding recess 15, excess conductive adhesive 7 flows up to the central area of the optical filter 3, so that it is possible to reliably prevent the viewing angle from being narrowed. Therefore, it is possible to provide an infrared sensor providing predetermined characteristics.

In the first preferred embodiment, an optical filter formed of a low-resistance material (single-crystal silicon) is preferably used as the optical filter 3. However, it is possible to use, as the optical filter 3, an optical filter in which a surface of a filter substrate, formed of an insulating material, is coated with a metallic coating, such as a germanium (Ge) coating, by evaporation or other methods. The coating is formed of a low-resistance material. The optical filter 3 is joined to the metallic package 2 by a conductive adhesive through the coating formed of the low-resistance material, so that the optical filter 3 and the package 2 are in electrical conduction with each other.

As the material of the filter substrate of the optical filter, in addition to single-crystal silicon, various other materials, such as quartz, sapphire, barium fluoride, and spinel, that transmit infrared radiation may be used.

In the first preferred embodiment, the infrared sensor element is what is called a dual-type pyroelectric infrared sensor using a pyroelectric element. However, in the present invention, the type of infrared sensor element is not particularly limited. Therefore, the present invention is applicable to an infrared sensor using various other types of infrared sensor elements, such as a single-type element, a quad-type element, a thermopile, or a photodiode.

In the first preferred embodiment, as the package 2, a package having a structure in which the main portion of the metallic package body 21 is covered with the insulating covering material 22 is preferably used. However, the present invention is applicable to a package having a structure in which the main portion is metallic and only a portion that needs to be covered with an insulating material is covered with an insulating material, and to a package in which the main portion is formed of an insulating material, and a conductive material is provided only on a portion required for electrical connection.

Since the infrared sensor according to the first preferred embodiment includes the electrodes (and wiring patterns, etc.) 11 in the package 2, the number of electrodes and wiring patterns to be formed on other members is reduced, so that the size of a product and the number of components can be reduced.

Since the package 2 includes the bases 12 that support the infrared sensor element 1, a separate supporting member is not required. Therefore, the number of components and the size of a product can be further reduced.

Since the bottom portion of the package 2 functions as a stem of a related infrared sensor, it is possible to reduce the size of a product also from this viewpoint.

As regards other points, the present invention is not limited to the first preferred embodiment. Accordingly, various applications and modifications may be made within the scope of the present invention as regards, for example, the specific structure and form of the package, or the type of adhesive (conductive adhesive) for joining the optical filter and the package to each other.

As mentioned above, according to preferred embodiments of the present invention, it is possible to provide a small infrared sensor not requiring a complicated structure or a complicated manufacturing process, and providing a wide infrared light-receiving area (viewing angle).

In addition, it is possible to provide an infrared sensor having excellent electromagnetic shielding characteristics, in which an optical filter and a package can be reliably joined together and an infrared sensor element is accommodated in a sealing space formed by the optical filter and the package that are electrically connected to each other.

Therefore, the present invention can be widely used in the field of a general-purpose infrared sensor used in, for example, detection of a human body or crime-preventing devices.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An infrared sensor comprising:
   an infrared sensor element;
   a box package accommodating the infrared sensor element in an interior thereof so as to allow surface mounting, the package having one substantially rectangular side that is open; and
   an optical filter arranged so as to transmit infrared radiation of a predetermined wavelength, the optical filter being disposed so as to cover the opening, whose shape is substantially rectangular in plan view, of the package, the optical filter arranged to cause the infrared sensor element to receive the infrared radiation having the predetermined wavelength, and arranged to define a cover that seals the opening; wherein
   supporting portions are disposed only at four corners of the opening of the package, the supporting portions support only portions of the optical filter in the vicinity of the four corners of the opening, the optical filter is disposed so as to cover the opening, and the supporting portions are disposed at positions that are lower than an upper end of an inner peripheral wall defining the opening;
   while the optical filter is supported by the supporting portions as a result of inserting a portion of a surface side of the optical filter facing the supporting portions into the opening, the optical filter is secured to the package; and
   the package includes a metallic package body and an insulating covering material that is disposed on inner and outer surfaces of the metallic package body such that it covers a main portion of the metallic package body, and the metallic package body is exposed at an area that is connected to the optical filter through conductive adhesive so that the conductive adhesive electrically connects the optical filter and the package body to each other.

2. The infrared sensor according to claim 1, wherein the optical filter and the package are joined and secured, and electrically connected to each other through a conductive adhesive.

3. The infrared sensor according to claim 1, wherein a peripheral area defining the opening of the package is lower than an outer-side area of the peripheral area defining the opening, and the peripheral area cooperates with a side end of a portion protruding from the upper end of the inner peripheral wall defining the opening of the optical filter so as to define a holding recess that holds the conductive adhesive.

* * * * *